Figure 1:
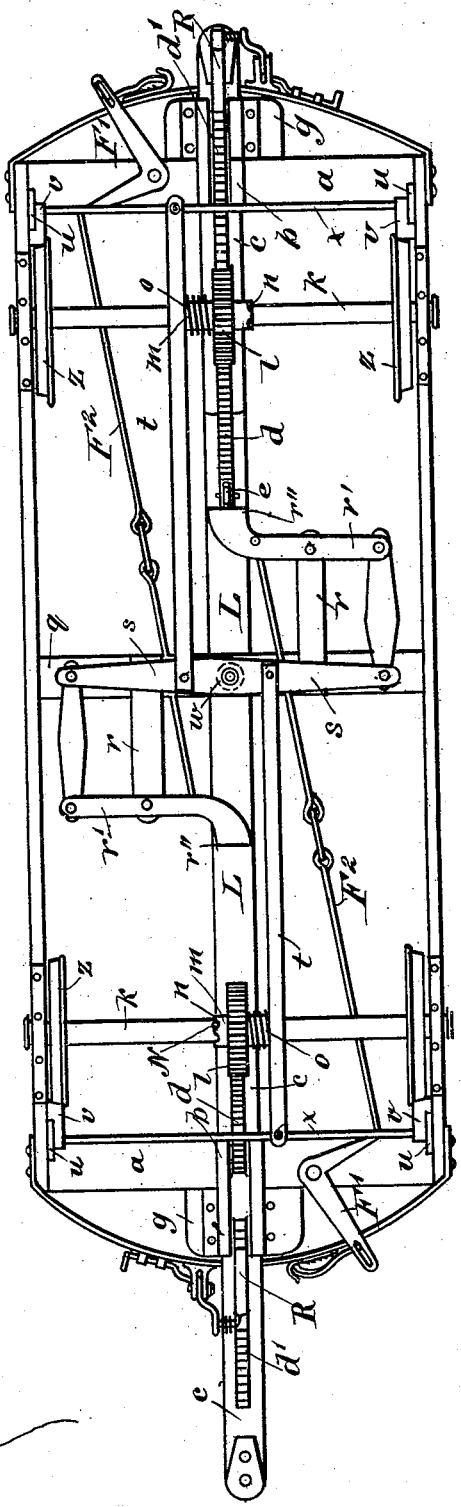

(No Model.)

2 Sheets—Sheet 1.

F. ADLER.
TRAMWAY BRAKE.

No. 475,171.

Patented May 17, 1892.

WITNESSES:
C. Sedgwick
E. M. Clark

INVENTOR:
F. Adler
BY Munn & Co
ATTORNEYS (No Model.) 2 Sheets—Sheet 2.
F. ADLER.
TRAMWAY BRAKE.
No. 475,171. Patented May 17, 1892.
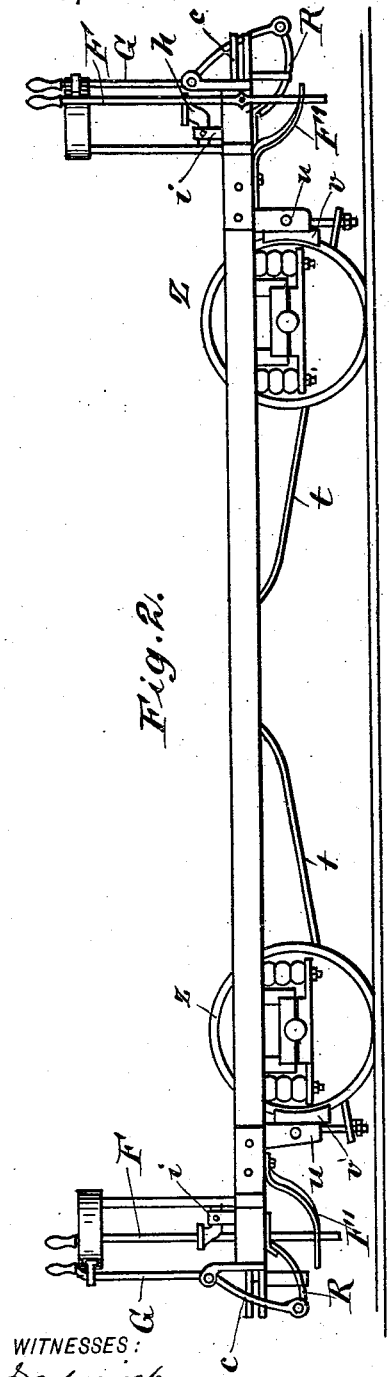
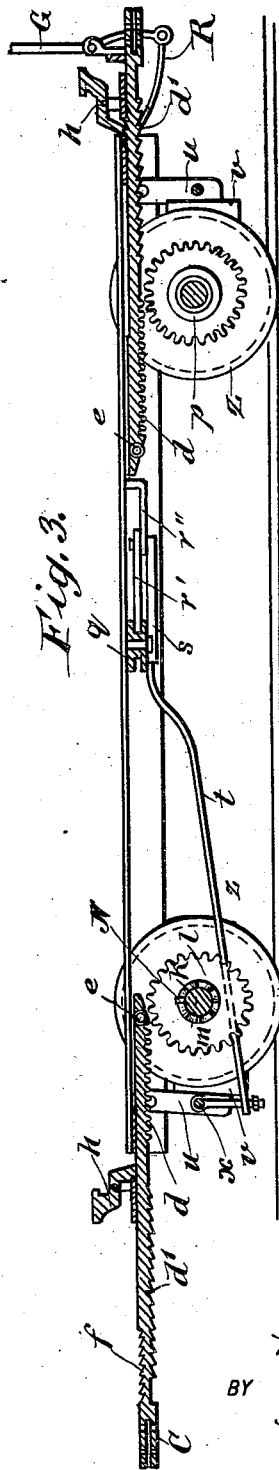
WITNESSES:
C. Sedgwick
E. M. Clark
INVENTOR:
F. Adler
BY
Munn & Co.
ATTORNEYS

UNITED STATES PATENT OFFICE.

FRIEDRICH ADLER, OF PRAGUE, AUSTRIA-HUNGARY.

TRAMWAY-BRAKE.

SPECIFICATION forming part of Letters Patent No. 475,171, dated May 17, 1892.

Application filed December 23, 1891. Serial No. 416,010. (No model.)

*To all whom it may concern:*

Be it known that I, FRIEDRICH ADLER, of Prague, in the Kingdom of Bohemia and Empire of Austria-Hungary, have invented a new and useful Tramway-Brake, of which the following is a specification, reference being had therein to the accompanying drawings.

The invention relates to tramway-brakes.

It is well known that rapid wear and tear of horse-flesh used on tramway and other vehicles takes place, and that this is to a large extent due to the particular nature of the mode of traveling—namely, to the frequent stoppages and restartings of the tram-cars and because the momentum of the car is lost when stopping, and the dead-weight of the car has to be overcome and requires considerable effort to be applied in restarting.

The types of apparatus to which this invention relates are those which have for their object to reduce the expenditure of force required for starting and to apply a brake automatically to the wheels immediately the pull on the tram-car lessens.

The following is a description of the invention, reference being had to the annexed sheets of drawings, in which—

Figure 1 is a plan of a tram-car frame provided with apparatus according to this invention and viewed from the under side. Fig. 2 is a side elevation, and Fig. 3 is a longitudinal section, of the tram car frame and apparatus.

With reference to the drawings, $a$ designates the cross-beam at each end of the car-frame. On these cross-beams $a$ there are provided two draw-bars $c$, having toothed racks, which are movable longitudinally under the car-floor between two guiding-pieces $b$. The draw-bars $c$ have for their object to provide for the transmission of the drawing action of the horses to the car. At the inner ends of the draw-bars there are provided wheels $e$, by which the draw-bars are guided under the beam L. At the under side of the bars $c$ and near the inner ends there are provided teeth $d$, and on the upper sides, near the front, there are notches $f$ at right angles to the line of the bar $c$. On the front side of the cross-beam $a$ and under the bar $c$ there are brackets $g$, and over the bar $c$ there are treadle-pawls $h$, supported in forked brackets $i$, the said pawls $h$ taking into the notches $f$ on the bars $c$ and so holding them in such a manner that the forward motion of the bars $c$ can only take place when the pawls $h$ are raised.

$z$ are the wheels of the car. They are fast on the axles $k$, which run in axle-boxes. The axles $k$ are provided with cupped collars $p$, and on the said axles there are placed loose toothed wheels $l$, having centers $m$, which are provided on one side with ratchet-teeth or incisions $n$, in which a pin N, fixed to the axles $k$, catches, thus coupling the wheel $l$ to the axles $k$ in such a manner that the wheels $l$ act by transmitting the power when a pull at the draw-bar $c$ takes place, and on the other hand become uncoupled when the car runs forward or the draw-bar $c$ is pushed back, or when the wheels continue turning and the draw-bar $c$ is pushed back by the horses.

$o$ designates a spring, which is placed against the collar $p$ of the axle $k$ and on the center $m$ and presses the wheel $l$ in such a manner against the pin N that it is kept in gear with the teeth $n$ on the center $m$. When the rack $d$ is pulled and when the draw-bar $c$ has a backward motion, the wheel $l$ can move sidewise, so as to allow the teeth $n$ to slip over the pin N.

Below the center cross-beam $q$ of the car there is placed a lever $s$, kept in position by means of a spring $w$. This lever $s$ is connected at each end by connecting-rods to other levers $r'$, supported from the beam $q$ by brackets $r$. The ends of the levers $r'$ are provided with buffer-arms $r^2$. The lever $s$ operates by means of the rods $t$ the brake-rods $x$, and thus applies or removes the brake-blocks $v$, which are fixed to the frame of the car by means of the holders $u$.

The mode of action of the parts just described is, when the car is in motion, as follows: When starting the car, the driver disengages the pawl $h$ by pressing his foot thereon and the pull of the horse is applied to the draw-bar $c$, which is drawn forward, and the teeth $d$ gear with the teeth of the wheel $l$, setting such wheel, and thereby the axle $k$, in motion. The draw-bar $c$ moves forward until it reaches its full stroke and the teeth $d$ are out of gear with the wheel $l$, whereupon the pull is directly communicated to the car, which has been started by the movement of the wheels $z$, due to the drawing out of the bar $c$. It is obvious that by this arrangement for starting a much smaller expenditure of power is required than if the first pull were directly on the car. In order to put the brake on—that is to say, to reduce the speed of the car or to stop the car—the driver checks the speed of the horses or stops them altogether, whereupon the car runs forward on the draw-bar $c$ until the teeth $d$ engage with the teeth of the wheel $l$, which runs back loosely on the axle $k$, and the end of the draw-bar strikes against the buffer $r^2$ of the lever $r'$, and thereby by means of the lever $s$ and the connections $t$ presses the brake-blocks $v$ onto the wheels $z$ in such a manner as to brake all four wheels at the same time the pawl $h$ engages with the notches $f$ on the draw-bar $c$, and the car remains with the brake on until the pawl is again released and the draw-bar $c$ is again pulled forward, the spring $w$ taking off the brakes at the same time.

To enable the brake to be applied by hand and when the draw-bar $c$ is not used, the ends of the car are provided with bars F, which by means of the bell-crank levers F' and the rods F² work the levers $r'$, and thereby apply the brake.

The apparatus may also be worked by levers G, fitted at the ends of the car and arranged to give a backward movement to the draw-bar $c$. For this purpose the lever G is provided with a pawl R, which takes into notches $d'$, arranged on the under side of the draw-bar $c$, so that when the lever F is moved forward the draw-bar $c$ is pushed back and the apparatus thereby worked.

What I claim, and desire to secure by Letters Patent of the United States, is—

1. A car-starter comprising a sliding draw-bar provided with a rack, a gear-wheel mounted loosely on the axle and with which the rack engages, and a mechanism for locking the gear-wheel to the axle when the draw-bar is pulled out in the act of starting the car, whereby the wheels of the car will be revolved by the engagement of the teeth of the rack with the gear-wheel, substantially as described.

2. The combination, with a brake-lever, of a sliding draw-bar provided with a rack and adapted to operate the brake-lever when moved inward, a gear-wheel loose on the axle and with which the rack engages, and mechanism for locking the gear-wheel to the axle when the draw-bar is pulled out in the act of starting the car, substantially as described.

3. In apparatus for starting tram-cars or vehicles, a movable draw-bar $c$, having teeth gearing with a toothed wheel on or connected with the driving wheel or axle, and teeth, in connection with which is a pawl $h$, operated by the foot, substantially as described.

4. Apparatus or mechanism for starting and braking tram-car and other vehicles, consisting of a rack-moving draw-bar and toothed gearing, in combination with the brake-levers arranged as set forth, all as herein described, and shown in the drawings.

5. In apparatus for starting tram-cars or vehicles, the combination, with a movable draw-bar operated as herein described, of a ratchet mechanism operated by hand, by which the movement inward of said bar can be effected by hand, substantially as described.

6. The combination, with the moving rack draw-bar $c$, of the tooth-wheel $l$, mounted loosely on the shaft $k$ and having a boss with teeth $n$, working in connection with a pin N, fixed on the shaft $k$, and a spring $o$, said teeth $n$, pin, and spring constituting a clutch, as set forth with reference to the drawings.

7. A car-starter comprising a gear-wheel mounted loosely on the car-axle, a ratchet mechanism to lock the gear-wheel to the axle, a sliding draw-bar mounted on the car-frame and provided with a rack to engage the gear-wheel, and a foot-operated pawl to lock the draw-bar, substantially as shown and described.

8. The combination, with the sliding draw-bars and the brake-rods, of a pivoted cross-beam mounted centrally beneath the car and levers carried by the cross-beam, said levers being connected with the brake-rods and having buffers extending into the path of the draw-bars during the back-stroke of the latter, substantially as shown and described.

In witness whereof I have hereunto set my hand in presence of two witnesses.

FRIEDRICH ADLER.

Witnesses:
ADOLF KAHN,
SAMUEL FISCHER.